US012346460B2

(12) United States Patent
Yang et al.

(10) Patent No.: US 12,346,460 B2
(45) Date of Patent: Jul. 1, 2025

(54) DATA ENCRYPTION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Weiming Yang, Shenzhen (CN); Shaoming Wang, Shenzhen (CN); Runzeng Guo, Shenzhen (CN); Huizhong Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 259 days.

(21) Appl. No.: 17/986,225

(22) Filed: Nov. 14, 2022

(65) Prior Publication Data
US 2023/0070762 A1     Mar. 9, 2023

Related U.S. Application Data

(63) Continuation of application No. PCT/CN2022/085884, filed on Apr. 8, 2022.

(30) Foreign Application Priority Data

May 17, 2021   (CN) .......................... 202110536368.X

(51) Int. Cl.
G06F 21/60       (2013.01)
G06F 21/32       (2013.01)
(Continued)

(52) U.S. Cl.
CPC ............ *G06F 21/602* (2013.01); *G06F 21/32* (2013.01); *G06F 21/6209* (2013.01); *G06F 21/107* (2023.08)

(58) Field of Classification Search
None
See application file for complete search history.

(56) References Cited

U.S. PATENT DOCUMENTS 11,176,394 B2 * 11/2021 Ye .......................... G06V 40/168
11,290,447 B2 *  3/2022 Chen ................... H04L 63/0861
(Continued)

FOREIGN PATENT DOCUMENTS

CN     101350724 A     1/2009
CN     102419825 A     4/2012
(Continued)

OTHER PUBLICATIONS

The World Intellectual Property Organization (WIPO) International Search Report for PCT/CN2022/085884 Jul. 6, 2022 7 Pages (including translation).

Primary Examiner — Lashonda Jacobs-Burton
(74) Attorney, Agent, or Firm — ANOVA LAW GROUP PLLC

(57) ABSTRACT

A data encryption method includes: acquiring target data to be encrypted of a target object and object information corresponding to the target object, the object information including at least one of a face image or an audio signal of the target object; encrypting an object feature corresponding to the object information according to a reference public key, and determining the encrypted object feature as a safety factor of the target data; and encrypting the target data based on the safety factor, to obtain encrypted data corresponding to the target data.

18 Claims, 12 Drawing Sheets

(51) Int. Cl.
    *G06F 21/62*     (2013.01)
    *G06F 21/10*     (2013.01)

(56) References Cited

U.S. PATENT DOCUMENTS

| | | | |
|---|---|---|---|
| 11,436,435 B2 * | 9/2022 | Li | G06V 10/7788 |
| 11,615,176 B2 * | 3/2023 | Jindal | G06F 7/5443 |
| | | | 713/186 |
| 2021/0211291 A1 * | 7/2021 | Jindal | H04L 9/3231 |

FOREIGN PATENT DOCUMENTS

| | | | | | |
|---|---|---|---|---|---|
| CN | 103914634 A | * | 7/2014 | | G06F 21/10 |
| CN | 110503045 A | * | 11/2019 | | |
| CN | 111985912 A | * | 11/2020 | | |
| CN | 113516723 A | * | 10/2021 | | G06F 21/602 |
| CN | 113762971 A | | 12/2021 | | |
| CN | 116756761 A | * | 9/2023 | | |
| CN | 114598516 B | * | 4/2024 | | G10L 17/02 |
| CN | 114202781 B | * | 6/2024 | | G06F 21/602 |
| JP | 2016015578 A | | 1/2016 | | |

* cited by examiner

DATA ENCRYPTION METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2022/085884, filed on Apr. 8, 2022, which claims priority to Chinese Patent Application No. 202110536368.X, entitled "DATA ENCRYPTION METHOD AND APPARATUS, COMPUTER DEVICE, AND STORAGE MEDIUM" and filed on May 17, 2021, the entire contents of both of which are incorporated herein by reference.

FIELD OF THE TECHNOLOGY

Embodiments of the present disclosure relate to the field of computer technologies, and in particular, to a data encryption method and apparatus, a computer device, and a storage medium.

BACKGROUND OF THE DISCLOSURE

With the development of computer technologies, electronic payment has become a common means of payment, and can be implemented in more diversified ways. Generally, when making payment, a computer device acquires data of an object to be verified, and transmits the acquired data to a back-end server for verification before making payment. In order to ensure the security of the data, the data needs to be encrypted in this process.

SUMMARY

Embodiments of the present disclosure provide a data encryption method and apparatus, a computer device, and a storage medium, to improve the security of encrypted data. The technical solutions are as follows:

According to one aspect, a data encryption method is provided, the method including: acquiring target data to be encrypted of a target object and object information corresponding to the target object, the object information including at least one of a face image or an audio signal of the target object; encrypting an object feature corresponding to the object information according to a reference public key, and determining the encrypted object feature as a safety factor of the target data; and encrypting the target data based on the safety factor, to obtain encrypted data corresponding to the target data.

According to another aspect, a data encryption apparatus is provided, including: an information acquisition module, configured to acquire target data to be encrypted of a target object and object information corresponding to the target object, the object information including at least one of a face image or an audio signal of the target object; a safety factor obtaining module, configured to encrypt an object feature corresponding to the object information according to a reference public key, and determine the encrypted object feature as a safety factor of the target data; and a data encryption module, configured to encrypt the target data based on the safety factor, to obtain encrypted data corresponding to the target data.

According to another aspect, a computer device is provided, including a processor and a memory, the memory storing at least one computer program, the at least one computer program being loaded and executed by the processor to implement the operations performed in the data encryption method according to the foregoing aspect.

According to another aspect, a non-transitory computer-readable storage medium is provided, storing at least one computer program, the at least one computer program being loaded and executed by a processor to implement the operations performed in the data encryption method according to the foregoing aspect.

According to another aspect, a computer program product or a computer program is provided, including computer program code, the computer program code being stored in a computer-readable storage medium, a processor of a computer device reading the computer program code from the computer-readable storage medium, and the processor executing the computer program code to cause the computer device to implement the operations performed in the data encryption method according to the foregoing aspect.

According to the method, the apparatus, the computer device, and the storage medium provided in the embodiments of the present disclosure, during acquiring of the target data to be encrypted, at least one of the face image or the audio signal of the target object is acquired, and at least one of the feature of the face image or the feature of the audio signal is encrypted, so that the encrypted feature is used as the safety factor for encrypting the target data. In this encryption manner, the safety factor used for encrypting the target data includes at least one of the feature of the face image or the feature of the audio signal, and the feature of the face image or the feature of the audio signal is more complex and difficult to crack, thereby improving the security of the encrypted data.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other accompanying drawings from the accompanying drawings without creative efforts.

DESCRIPTION OF EMBODIMENTS

Figure 1:
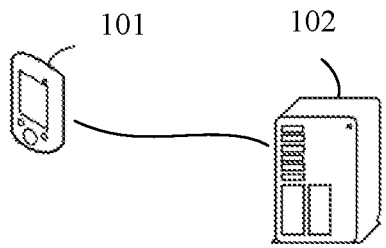
FIG. 1 is a schematic diagram of an implementation environment according to an embodiment of the present disclosure.

To make objectives, technical solutions, and advantages of the embodiments of the present disclosure clearer, the following further describes in detail implementations of the present disclosure with reference to the accompanying drawings.

It may be understood that, the terms "first", "second", and the like used in the present disclosure may be used for describing various concepts in this specification. However, the concepts are not limited by the terms unless otherwise specified. The terms are merely used for distinguishing one concept from another concept. For example, without departing from the scope of the present disclosure, a first audio clip may be referred to as a second audio clip, and a second audio clip may be referred to as a first audio clip.

For the terms "at least one", "a plurality of", "each", and "any" used in the present disclosure, "at least one" refers to "one", "two", or "more", "a plurality of" refers to "two" or "more", "each" refers to "each of a plurality of corresponding", and "any" refers to "any one of a plurality of". For example, if a plurality of audio clips include three audio clips, each audio clip refers to each of the three audio clips, and any audio clip refers to any one of the three audio clips, that is, may be a first audio clip, a second audio clip, or a third audio clip.

In the solutions provided in the embodiments of the present disclosure, according to technologies such as the computer vision technology, the speech recognition technology, and machine learning of artificial intelligence, feature extraction is performed on a face image or an audio signal, and whether the face image or the audio signal is obtained by acquiring a living object is determined.

A blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information about a batch of network transactions, the information being used for verifying the validity of information about the data block (anti-counterfeiting) and generating a next data block. The blockchain includes a blockchain underlying platform, a platform product service layer, and an application service layer.

In one embodiment, computer programs involved in the embodiments of the present disclosure may be deployed to be executed on a computer device, or deployed to be executed on a plurality of computer devices at the same location, or deployed to be executed on a plurality of computer devices that are distributed in a plurality of locations and interconnected by using a communication network. The plurality of computer devices that are distributed in the plurality of locations and interconnected by using the communication network can form a blockchain system.

In one embodiment, a terminal and a server in the embodiments of the present disclosure are nodes in the blockchain. The node corresponding to the terminal obtains a face image or an audio signal and encrypts target data. The encrypted data is stored on the blockchain, and then the node corresponding to the server in the blockchain may decrypt the encrypted data.

For ease of understanding the embodiments of the present disclosure, key terms involved in the embodiments of the present disclosure are first introduced below:

Supervised learning: Supervised learning refers to machine learning by using a training data set including labels, where each sample in the training data set includes an input object and an expected output of the input object.

Multi modal fusion: Multi modal fusion, that is, Multi Modal Machine Learning (MMML), is a machine learning method to achieve a capability of processing and understanding multi source modal information, such as multi modal learning between images, videos, audio and semantics. Single modal representation learning can represent information as a numerical vector that can be processed by a computer device or further abstracted as a higher-level feature vector, and multi modal representation learning can eliminate redundancy among different modes by using complementarity among multiple modes, to learn better feature representation. The multi modal representation learning includes two major research directions: Joint Representations and Coordinated Representations.

Face scanning data: Face scanning data is face data acquired by a device during a face scanning transaction.

The data encryption method provided in the embodiments of the present disclosure is performed by a computer device. The computer device is a terminal or a server. The following method embodiments are described by using an example in which the data encryption method is performed by a terminal. However, in another embodiment, the data encryption method is performed by a server. The execution process is similar to the following embodiments, and is not described again herein.

FIG. 1 is a schematic diagram of an implementation environment according to an embodiment of the present disclosure. Referring to FIG. 1, the implementation environment includes a terminal 101 and a server 102. The terminal 101 and the server 102 is connected by a wired or wireless network.

A target application to which the server 102 provides services is installed on the terminal 101, and the terminal 101 can implement functions such as data acquisition, data transmission, message interaction, and payment through the target application. In some embodiments, the target application is a target application in an operating system of the terminal 101, or an application provided by a third party. For example, the target application is a payment application having a payment function. Certainly, the payment application can also have other functions, such as a data transmission function, a shopping function, and a message interaction function.

In some embodiments, the terminal 101 is a smartphone, a tablet computer, a notebook computer, a desktop computer, a smart speaker, a smart watch, or a face scanning device, but is not limited thereto. In some embodiments, the server 102 is an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

Based on the implementation environment shown in FIG. 1, a face scanning payment scenario is provided. When shopping, a user pays to a merchant through face scanning payment. In this case, a terminal obtains the amount to be paid, account information of the user who pays, account information of the merchant who receives the payment, and face data of the user as target data (face scanning data) to be encrypted, acquires a face image of the user and a voice made by the user to encrypt an image feature of the face image and an audio feature of the voice, and uses the encrypted image feature and the encrypted audio feature as a safety factor to encrypt the target data to obtain encrypted data. Then the terminal transmits the encrypted data to a server, and the server decrypts the encrypted data and verifies whether the payment is allowed. If the verification is successful, the server returns the payment information to the terminal, and the payment is completed after the user confirms.

Figure 2:
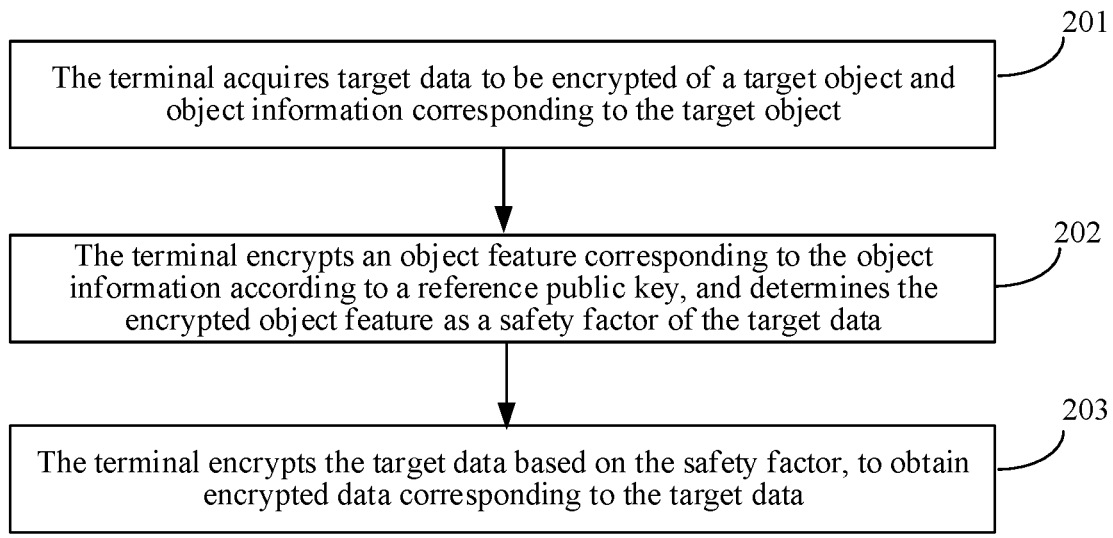
FIG. 2 is a flowchart of a data encryption method according to an embodiment of the present disclosure.

FIG. 2 is a flowchart of a data encryption method according to an embodiment of the present disclosure. An execution body of this embodiment of the present disclosure is a terminal. Referring to FIG. 2, the method includes the following steps:

201: The terminal acquires target data to be encrypted of a target object and object information corresponding to the target object.

The target object is any object, the target data is data to be encrypted, the object information is information used for describing the target object, and the object information is used for encrypting the target data. The target data includes at least one of face data, payment data, or fingerprint data, and the object information includes at least one of a face image or an audio signal of the target object.

The data or information acquired by the terminal is acquired with the full authorization of the user. For example, the terminal displays an acquisition confirmation option and prompts to authorize the terminal to acquire data by triggering the acquisition confirmation option. After the target object triggers the acquisition confirmation option, the terminal confirms to be authorized in response to the trigger operation of the acquisition confirmation option and acquire the target data and the object information of the target object.

202: The terminal encrypts an object feature corresponding to the object information according to a reference public key, and determines the encrypted object feature as a safety factor of the target data.

The reference public key is a public key stored in the terminal and used for encrypting the object information. For example, the reference public key is transmitted by a server corresponding to the terminal, and the safety factor is used for encrypting the target data. The object feature includes at least one of an image feature of the face image or an audio feature of the audio signal. In some embodiments, when the object feature includes the image feature and the audio feature, the image feature and the audio feature are encrypted respectively according to the reference public key, or the image feature and the audio feature are concatenated first, the concatenated feature is determined as the object feature, and the object feature is encrypted according to the reference public key.

203: The terminal encrypts the target data based on the safety factor, to obtain encrypted data corresponding to the target data.

In this embodiment of the present disclosure, after obtaining the safety factor, the terminal encrypts the target data based on the safety factor. The safety factor and the target data can be combined in any manner, which is not limited in this embodiment of the present disclosure.

In the related art, a timestamp is usually used to encrypt data asymmetrically, but such encrypted data is easy to be cracked and have low security.

According to the method provided in this embodiment of the present disclosure, during acquiring of the target data to be encrypted, at least one of the face image or the audio signal of the target object is acquired, and at least one of the feature of the face image or the feature of the audio signal is encrypted, so that the encrypted feature is used as the safety factor for encrypting the target data. In this encryption manner, the safety factor used for encrypting the target data includes at least one of the feature of the face image or the feature of the audio signal, and the feature of the face image or the feature of the audio signal is more complex and difficult to crack, thereby improving the security of the encrypted data.

Figure 3:
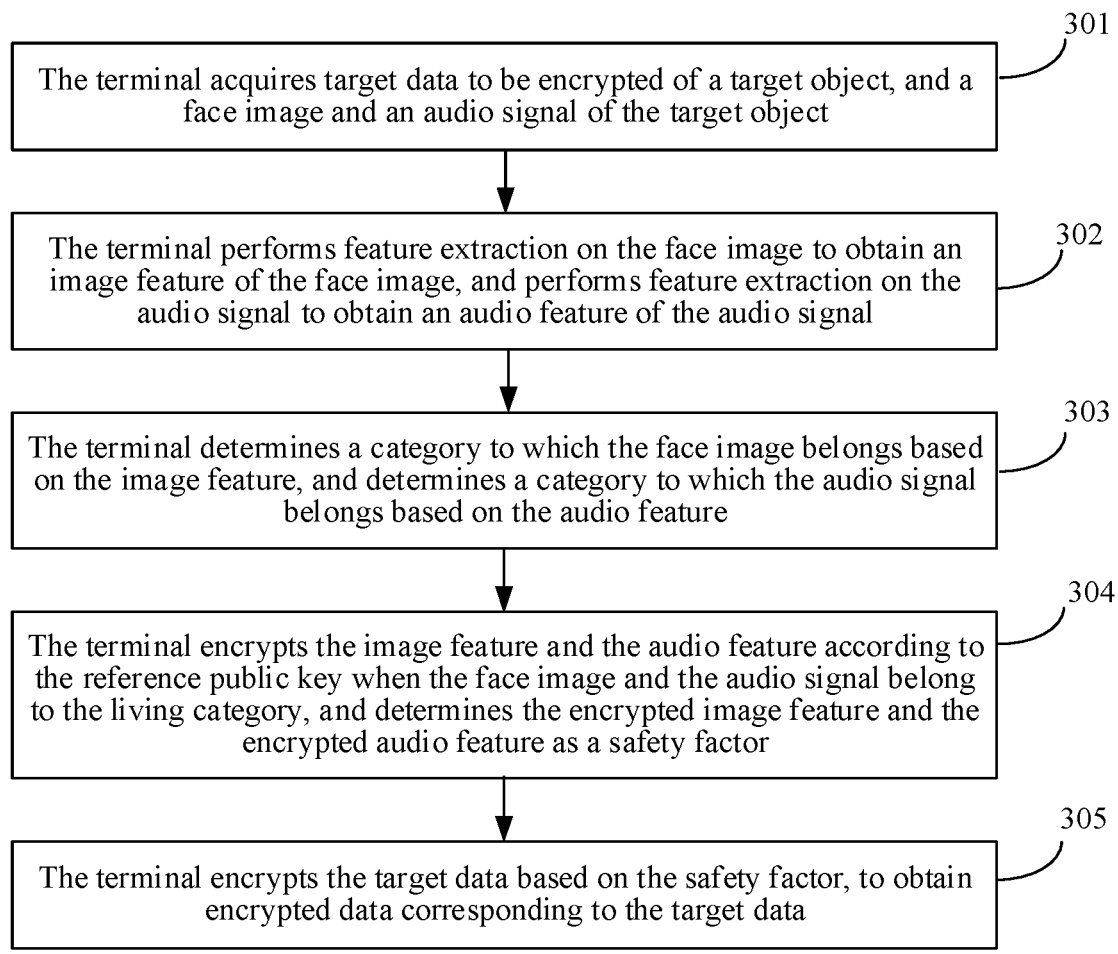
FIG. 3 is a flowchart of another data encryption method according to an embodiment of the present disclosure.

FIG. 3 is a flowchart of a data encryption method according to an embodiment of the present disclosure. An execution body of this embodiment of the present disclosure is a terminal. Referring to FIG. 3, the method includes the following steps:

301: The terminal acquires target data to be encrypted of a target object, and a face image and an audio signal of the target object.

The target object is any object, for example, the target object is a user who needs to pay, the target data is data to be encrypted, the object information is information used for describing the target object, and the object information is used for encrypting the target data. The target data includes at least one of face data, payment data, or fingerprint data, and the object information includes at least one of a face image or an audio signal of the target object. The payment data includes the amount to be paid, account information for making payment, account information for receiving payment, or other information.

In one embodiment, the terminal acquires the face image of the target object through a camera and acquires the audio signal of the target object through a microphone. In one case, the face image and the audio signal of the target object are acquired from a living object. For example, the target object stands in front of the camera, the terminal acquires the face image through the camera, the target object talks to the microphone, and the terminal acquires speech of the target object through the microphone. Alternatively, in another case, the face image and the audio signal of the target object are acquired from a non-living object. For example, another computer device is placed in front of the camera, and the face image of the target object is displayed on the screen of the computer device. The terminal acquires the face image through the camera, or the computer device plays the audio of the target object, and the terminal acquires the audio signal through the microphone.

In one embodiment, the terminal is installed with a target application, through which the terminal acquires the target data, the face image, and the audio signal. For example, the target application is a payment application, and the target data is face data. When a user makes face scanning payment through the target application, the target application acquires the face data, the face image, and the audio signal of the target object.

Figure 4:
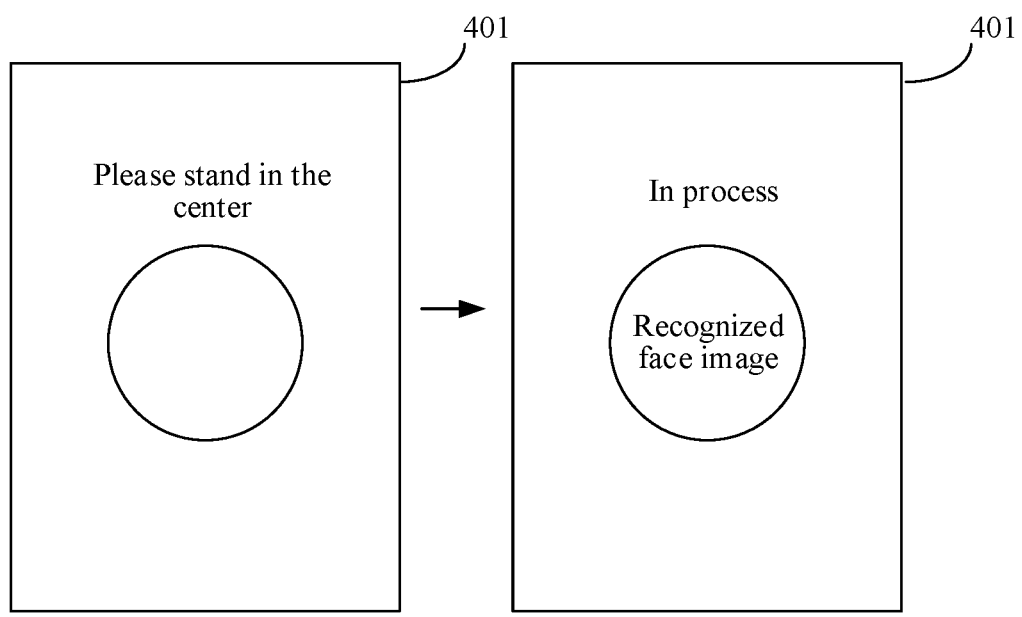
FIG. 4 is a schematic diagram of an image acquisition interface according to an embodiment of the present disclosure.

In one embodiment, the terminal acquires the face image through an image acquisition interface. The image acquisition interface includes an image acquisition region and prompt information. The prompt information is used for prompting the operation to be performed by the user. The acquired face image is an RGB (Red Green Blue) three-color image or an image in another format. For example, referring to the image acquisition interface 401 shown in FIG. 4, the prompt information "Please stand in the center" is displayed in the image acquisition interface, a circular image acquisition region is displayed below the prompt information, the prompt information "In process" is displayed in the process of acquiring the face image, and the recognized face image is displayed in the image acquisition region.

Figure 5:
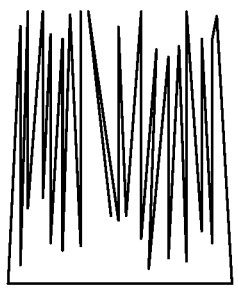
FIG. 5 is a schematic diagram of an audio signal according to an embodiment of the present disclosure.
Figure 6:
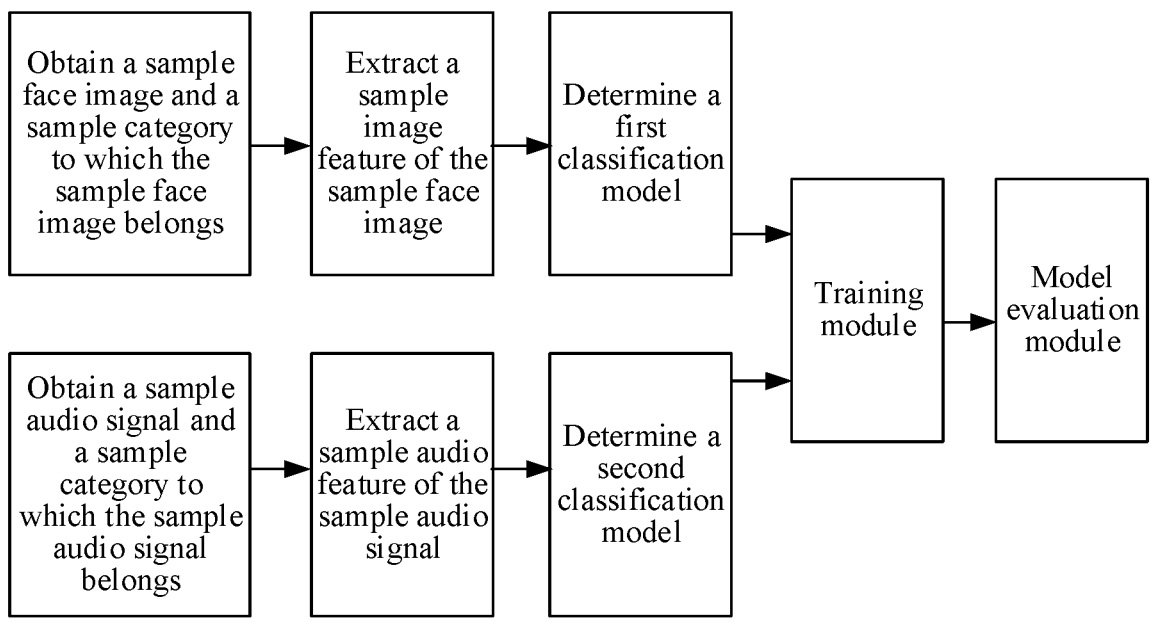
FIG. 6 is a schematic diagram of model training according to an embodiment of the present disclosure.

In one embodiment, a sampling rate and a sampling depth when the terminal acquires the audio signal are any value, and the acquired audio signal may be a mono channel or a dual channel. For example, referring to the audio signal shown in FIG. 5, the audio signal has a sampling rate of 16 k and a sampling depth of 16 bits. In addition, the duration of the acquired audio signal is not limited in this embodiment of the present disclosure, and the audio signal may be any duration, for example, the audio signal is 5 s, 10 s, or another duration. For the content of the audio signal, in some embodiments, the target object transmits the audio signal according to reference content, and the content of the audio signal is the reference content. For example, the reference content is "Please identify my voice", or the content of the audio signal may be any content.

In addition, when the target data includes face data, there is duplicate content between the face data and the face image. The terminal can acquire the face data included in the target data and the face image used for encrypting the target data in different manners respectively or in the same mode, which is not limited in this embodiment of the present disclosure. Alternatively, the terminal acquires the face data and the face image used for encrypting the target data respectively, or acquires the face image of the target object and then directly determines the face image as the face data to be encrypted, so as to obtain the face image and the face data at once, which is not limited in this embodiment of the present disclosure.

In this embodiment of the present disclosure, the sequence of acquiring the face image and the audio signal is not limited. In some embodiments, the terminal acquires the face image and the audio signal at the same time, or the terminal first acquires the face image and then acquires the audio signal, or the terminal first acquires the audio signal and then acquires the face image.

302: The terminal performs feature extraction on the face image to obtain an image feature of the face image, and performs feature extraction on the audio signal to obtain an audio feature of the audio signal.

The image feature is used for describing the face image, and the image feature is a vector, a matrix, or a feature in another form; The audio feature is used for describing the audio signal, and the audio feature is a vector, a matrix, or a feature in another form.

The terminal adopts different manners to perform feature extraction on the face image and the audio signal respectively. The following describes a feature extraction manner of the face image and a feature extraction manner of the audio signal respectively:

1. Extract an Image Feature

In one embodiment, the terminal divides the face image into a plurality of second face regions; performs feature extraction on the plurality of second face regions respectively, to obtain a second region feature of each second face region; and concatenates the plurality of obtained second region features, to obtain the image feature. There is no overlapping region between any two second face regions. Concatenating the plurality of second region features means connecting the plurality of second region features end to end according to the position relationship of the second face regions corresponding to the plurality of second region features in the face image, to obtain the image feature.

In some embodiments, the terminal divides the face image according to the resolution, and the resolution of the each second face region may be the same or different, that is, the sizes of any two second face regions may be the same or different. For example, the resolution of the face image is 1920*1080, the face image is divided by the resolution of 60*60 to obtain a plurality of second face regions, and the resolution of each second face region is 60*60.

For the feature extraction manner of the each second face region, In one embodiment, the terminal performs edge detection on the second face region to obtain an image gradient corresponding to the second face region, and determines the image gradient as the second region feature of the second face region, where the image gradient represents a change rate of any two adjacent pixel points in the second face region. In some embodiments, the image gradient includes a gradient amplitude and a gradient direction. The terminal performs edge detection on the second face region by using a Sobel operator, a Scharr operator, a Laplace operator, or another manner.

For example, the Sobel algorithm is used to determine the image gradient using the following formula:

$$M(x, y) = \sqrt{I_x^2 + I_y^2}$$

$$\theta(x, y) = \tan^{-1}\frac{I_y}{I_x} \in [0°, 360°) \text{ or } [0°, 180°)$$

$I_x^2$ represents a gradient value of the second face region in the horizontal direction, $I_y^2$ represents a gradient value of the second face region in the vertical direction, M(x,y) represents a gradient amplitude of the second face region, and θ(x,y) represents a gradient direction of the second face region, where the gradient direction is represented in angle, and the range of the angle is 0°-360° or 0°-180°.

In another embodiment, the terminal directly performs feature extraction on the acquired face image to obtain the image feature of the face image, without dividing the face image.

In another embodiment, the terminal performs feature extraction on the face image based on an image feature extraction model to obtain the image feature of the face image. The image feature extraction model may be trained and stored by the terminal, or transmitted to the terminal by another device, which is not limited in this embodiment of the present disclosure.

2. Extract an Audio Feature

In one embodiment, the terminal divides the audio signal into a plurality of second audio clips; performs feature extraction on the plurality of second audio clips respectively, to obtain a second clip feature of each second audio clip; and concatenates the plurality of obtained second clip features, to obtain the audio feature. There is no overlapping part between any two second audio clips. Concatenating the plurality of second clip features means connecting the plurality of second clip features end to end according to the sequence of the second audio clips corresponding to the plurality of second audio features in the audio signal, to obtain the audio feature.

In some embodiments, the audio signal is divided according to the duration of the audio signal. The terminal divides the audio signal into a plurality of second audio clips according to a reference duration, and the duration of each second audio clip is the reference duration, for example, the reference duration is 1 s, 2 s or another duration. Alternatively, the audio signal is divided according to the quantity of sampling points included in the audio signal. The terminal divides the audio signal into a plurality of second audio clips according to a reference quantity, and each second audio clip includes sampling points of the reference quantity, for example, the quantity of the sampling points is 40, 80 or another number.

For the feature extraction manner of the each second audio clip, In one embodiment, the terminal performs Fourier transform on the second audio clip to obtain a transformed second audio clip; and converts the transformed second audio clip into a spectral feature corresponding to the second audio clip, and determines the spectral feature as the second clip feature of the second audio clip.

In some embodiments, the terminal extracts a Mel-Frequency Spectrum (MFC) of the second audio clip. The terminal adopts a Triangular Overlapping Window function to map the transformed second audio clip to the Mel scale, takes the logarithm of the obtained result, then performs discrete cosine transform on the result after the logarithm is taken, to obtain a Mel-Frequency Cepstral Coefficient (MFCC), and determines the obtained Mel-Frequency Cepstral Coefficient as the second clip feature.

In another embodiment, the terminal directly performs feature extraction on the acquired audio signal to obtain the audio feature of the audio signal, without dividing the audio signal.

In another embodiment, the terminal performs feature extraction on the audio signal based on an audio feature extraction model to obtain the audio feature of the audio signal. The audio feature extraction model may be trained and stored by the terminal, or transmitted to the terminal by another device, which is not limited in this embodiment of the present disclosure.

In this embodiment of the present disclosure, the sequence of extracting the image feature and the audio feature is not limited. In some embodiments, the terminal extracts the image feature and the audio feature at the same time, or the terminal first extracts the image feature and then extracts the audio feature, or the terminal first extracts the audio feature and then extracts the image feature.

303: The terminal determines a category to which the face image belongs based on the image feature, and determines a category to which the audio signal belongs based on the audio feature.

The category includes a living category and a lifeless category. The object information belonging to the living category means that the object information is information about a living object, and the object information belonging to the lifeless category means that the object information is information about a non-living object. That is, the face image belonging to the living category means that the face image is an image of a living target object, the face image belonging to the lifeless category means that the face image is an image of a non-living target object, the audio signal belonging to the living category means that the audio signal is an audio signal of a living target object, and the audio signal belonging to the lifeless category means that the audio signal is an audio signal of a non-living target object. For example, if the terminal acquires the speech of the target object in front of the microphone, the acquired audio signal belongs to the living category.

For the image feature of the face image, In one embodiment, the terminal divides the obtained image feature into a plurality of first region features, where the face image includes a plurality of first face regions, and each first region feature corresponds to a first face region in the face image; determines a category to which the first face region corresponding to the each first region feature belongs based on the each first region feature; determines a first ratio of first face regions belonging to the living category in the plurality of first face regions; and determines that the face image belongs to the living category in response to the first ratio being greater than a first reference ratio, and determines that the face image belongs to the lifeless category in response to the first ratio being not greater than the reference ratio. The first reference ratio is any ratio, for example, the first reference ratio is 80%, 85%, or another ratio. The first face region may be the same as or different from the second face region in step 302 above.

For the audio feature of the audio signal, In one embodiment, the terminal divides the obtained audio feature into a plurality of first clip features, where the audio signal includes a plurality of first audio clips, and each first clip feature corresponds to a first audio clip in the audio signal; determines a category to which the first audio clip corresponding to the each first clip feature belongs based on the each first clip feature; determines a second ratio of first audio clips belonging to the living category in the plurality of first audio clips; and determines that the audio clip belongs to the living category in response to the second ratio being greater than a second reference ratio, and determines that the audio clip belongs to the lifeless category in response to the second ratio being not greater than the second reference ratio. The second reference ratio is any ratio, for example, the second reference ratio is 80%, 85%, or another ratio. The first audio clip may be the same as or different from the second audio clip in step 302 above.

For the each first clip feature, In one embodiment, the terminal determines the category to which the first audio clip corresponding to the first clip feature belongs based on the first clip feature and the audio feature. That is, when determining the category to which the first audio clip belongs, the first clip feature of the first audio clip and the audio feature of the audio signal are considered, so that the category to which the first audio clip belongs can be determined more accurately.

In another embodiment, the terminal classifies an image feature of the face image based on a first classification model, to obtain a category to which the face image belongs. The terminal classifies an audio feature of the audio signal based on a second classification model, to obtain a category to which the audio signal belongs. The detailed process and model structure of the terminal performing classification based on the first classification model and the second classification model are described in the following embodiments shown in FIG. 6 to FIG. 12, and are not described herein again.

304: The terminal encrypts the image feature and the audio feature according to the reference public key when the face image and the audio signal belong to the living category, and determines the encrypted image feature and the encrypted audio feature as a safety factor.

In this embodiment of the present disclosure, the image feature and the audio feature are encrypted only when the face image and the audio signal belong to the living category, so that the image feature of the face image belonging to the living category and the audio feature of the audio signal belonging to the living category also need to be used for decryption during subsequent decryption, and the security of the safety factor is further improved.

In one embodiment, the terminal can also encrypt a reference feature, and also use the encrypted reference feature as a safety factor. The reference feature includes at least one of a timestamp, a counter, or a random number. For example, the format of the safety factor is as follows:

{magic_num} {device_info} {sign_version} {timestamp} {counter} {random} {multi modal learning safety factor} magic_num represents an overall format of the safety factor, device_info represents device information for determining the safety factor, sign_version represents a signature during encryption, timestamp represents a timestamp, counter represents a counter, random represents a random number, and multi modal learning safety factor represents the encrypted image feature and encrypted audio feature.

In this embodiment of the present disclosure, an example in which the image feature and the audio feature are encrypted when both the face image and the audio signal belong to the living category is only used for description. In another embodiment, the terminal does not perform step 303 above, that is, the terminal no longer determines the categories to which the face image and the audio signal belong, and directly encrypts the image feature and the audio feature after obtaining the image feature and the audio feature. Alternatively, in another embodiment, it is not required that both the face image and the audio signal belong to the living category. As long as one of the face image and the audio signal belongs to the living category, the image feature and the audio feature can be encrypted.

305: The terminal encrypts the target data based on the safety factor, to obtain encrypted data corresponding to the target data.

The terminal presets an encryption format corresponding to the target data and encrypts according to the encryption format, that is, the terminal encrypts the target data based on the encryption format corresponding to the target data and the safety factor to obtain the encrypted data. The encryption format indicates a relative position relationship between the safety factor and the target data in the encrypted data, for example, the safety factor is located before the target data, or the safety factor is located after the target data. The safety factor includes features such as an image feature, an audio feature, a counter, and a timestamp. Different features are arranged in the sequence of the image feature, the audio feature, the counter, and the timestamp. Certainly, different features in the safety factor may also be arranged in other sequence, which is not limited in the present disclosure. For example, the format of the encrypted data is as follows:

{magic_num} {device_info} {sign_version} {timestamp} {counter} {parallel multi modal learning complete factor} {random} {payload} magic_num represents an overall format of the safety factor, device_info represents device information for determining the safety factor, sign_version represents a signature during encryption, timestamp represents a timestamp, counter represents a counter, random represents a random number, payload represents target data, and parallel multi modal learning safety factor represents an object feature obtained by concatenating the encrypted image feature and the encrypted audio feature.

In addition, In one embodiment, after receiving the encrypted data, the terminal transmits the encrypted data to the server, and the server decrypts the encrypted data to obtain the target data and the safety factor. For example, the target data and the security factor are parsed from the encrypted data according to the relative position relationship between the safety factor and the target data in the encrypted data indicated by the encryption format. However, in this case, the target data is not directly determined as the encrypted data, but the safety factor needs to be verified first. Therefore, according to a reference private key corresponding to the reference public key, the safety factor is decrypted to obtain the image feature and the audio feature included in the safety factor, and obtain the pre-stored face image and audio signal of the target object to determine whether the image feature and the audio feature included in the safety factor are consistent with the image feature of the face image and the audio feature of the audio signal that are stored in the server. If they are consistent, the verification is successful, and the target data is determined as the decrypted data. That is, the server determines at least one of the face data, the payment data, or the fingerprint data currently used for payment, and returns verification success information to the terminal, and the terminal displays a payment confirmation interface. The target object confirms the payment through the payment confirmation interface, thereby completing the payment based on the target data. When obtaining the image feature of the face image and the audio feature of the audio signal that are pre-stored, the server can use the same feature obtaining manner as in step 302 to avoid different feature obtaining manners, which may lead to differences in the obtained features and affect the verification.

In some embodiments, if the image feature included in the safety factor is inconsistent with the image feature of the face image stored in the server, or the audio feature included in the safety factor is inconsistent with the audio feature of the audio signal stored in the server, the verification fails. The server returns verification failure information to the terminal, and the terminal displays a verification failure interface, which prompts the target object to perform reverification.

In some embodiments, the face image and the audio signal of the target object stored in the server are acquired from the living target object and belong to the living category. Based on step 304 above, the terminal performs encryption when the face image and the audio signal belong to the living category, so that it can be ensured that the image feature and the audio feature included in the safety factor are consistent with the image feature of the face image and the audio feature of the audio signal that are stored in the server, and then the verification is successful.

In the embodiment shown in FIG. 3, an example in which the object information includes the face image and the audio signal is only used for description. In another embodiment, the object information includes the face image, the image feature of the face image is encrypted according to the reference public key, and the encrypted image feature is determined as the safety factor of the target data, and the target data is encrypted based on the safety factor to obtain the encrypted data. Alternatively, the object information includes the audio signal, the audio feature of the audio signal is encrypted according to the reference public key, the encrypted audio feature is determined as the safety factor of the target data, and the target data is encrypted based on the safety factor to obtain the encrypted data.

According to the method provided in this embodiment of the present disclosure, during acquiring of the target data to be encrypted, at least one of the face image or the audio signal of the target object is acquired, and at least one of the feature of the face image or the feature of the audio signal is encrypted, so that the encrypted feature is used as the safety factor for encrypting the target data. In this encryption manner, the safety factor used for encrypting the target data includes at least one of the feature of the face image or the feature of the audio signal, and the feature of the face image or the feature of the audio signal is more complex and difficult to crack, thereby improving the security of the encrypted data.

In addition, in this embodiment of the present disclosure, the categories to which the face image and the audio signal belong are determined. When the face image belongs to the living category and the audio signal belongs to the living category, the encrypted image feature and the encrypted audio feature are determined as a safety factor, so that when subsequent decryption is required, the acquired face image and audio signal are verified according to the pre-stored face image and audio signal belonging to the living category. Only the face image and the audio signal belonging to the living category can pass the verification, while the face image and the audio signal not belonging to the living category cannot pass the verification, which further improves the security of the safety factor, thereby improving the security of the encrypted data.

In addition, in this embodiment of the present disclosure, the face image is divided into a plurality of face regions, to determine the category to which each face region respectively, then the ratio of the face regions belonging to the living category is determined by voting, and the category to which the face image belongs is determined according to the obtained ratio. In this manner of determining the category, even if there are individual classification errors, the determining of the category to which the face image belongs is not greatly affected, thereby making the classification more accurate. Similarly, the audio signal is divided into a plurality of audio clips, to determine the category to which each audio clip belongs respectively, then the ratio of the audio clips belonging to the living category is determined by voting, and the category to which the audio signal belongs is determined according to the obtained ratio. In this manner of determining the category, even if there are individual classification errors, the determining of the category to which the audio signal belongs is not greatly affected, thereby making the classification more accurate.

The following describes the process of determining the category to which the face image belongs based on a first classification model and the process of determining the category to which the audio signal belongs based on a second classification model:

Before the categories are determined based on the first classification model and the second classification model, the first classification model and the second classification model need to be trained respectively. Referring to the training process shown in FIG. 6, the terminal includes a training module and a model evaluation module. The terminal obtains a sample face image and a sample category to which the sample face image belongs, extracts a sample image feature of the sample face image, determines a first classification model, inputs the sample image feature into the determined first classification model through the training module, outputs a prediction category to which the sample face image belongs based on the first classification model and transmits the prediction category to the model evaluation module, and adjusts model parameters in the first classification model through the model evaluation module according to the difference between the sample category and the prediction category, so as to obtain the trained first classification model. Similarly, the terminal obtains a sample audio signal and a sample category to which the sample audio signal belongs, extracts a sample audio feature of the sample audio signal, determines a second classification model, inputs the sample audio feature into the determined second classification model through the training module, outputs a prediction category to which the sample audio signal belongs based on the second classification model and transmits the prediction category to the model evaluation module, and adjusts model parameters in the second classification model through the model evaluation module according to the difference between the sample category and the prediction category, so as to obtain the trained second classification model.

In some embodiments, the terminal obtains a sample image feature and a sample category to which a sample face image corresponding to the sample image feature belongs, where the sample category includes a living category and a lifeless category, the living category represents that the sample face image is an image of a living object, and the lifeless category represents that the sample face image is an image of a non-living object; determines a prediction category to which the sample face image belongs according to the sample image feature based on the first classification model; and trains the first classification model according to the sample category and the prediction category.

The terminal obtains a sample audio feature and a sample category to which a sample audio signal corresponding to the sample audio feature belongs, where the sample category includes a living category and a lifeless category, the living category represents that the sample audio signal is an audio signal of a living object, and the lifeless category represents that the sample audio signal is an audio signal of a non-living object; determines a prediction category to which the sample audio signal belongs according to the sample audio feature based on the second classification model; and trains the second classification model according to the sample category and the prediction category.

In one embodiment, hyper-parameters of the first classification model and the second classification model are preset before model training: iteration times (epoch), quantity of face regions or audio clips obtained through division (batch), and learning rate. For example, the hyper-parameters of the first classification model are: batch (128), epoch (1000), and learning rate (0.0001), and the hyper-parameters of the second classification model are: batch (128), epoch (5000), and learning rate (0.0001).

In this embodiment of the present disclosure, when the iterative training times of the first classification model and the second classification model reach a reference quantity, or the training durations of the first classification model and the second classification model reach a reference duration, the training for the first classification model and the second classification model ends, and the trained first classification model and second classification model are stored as files in pb (a file extension name) format.

Figure 7:
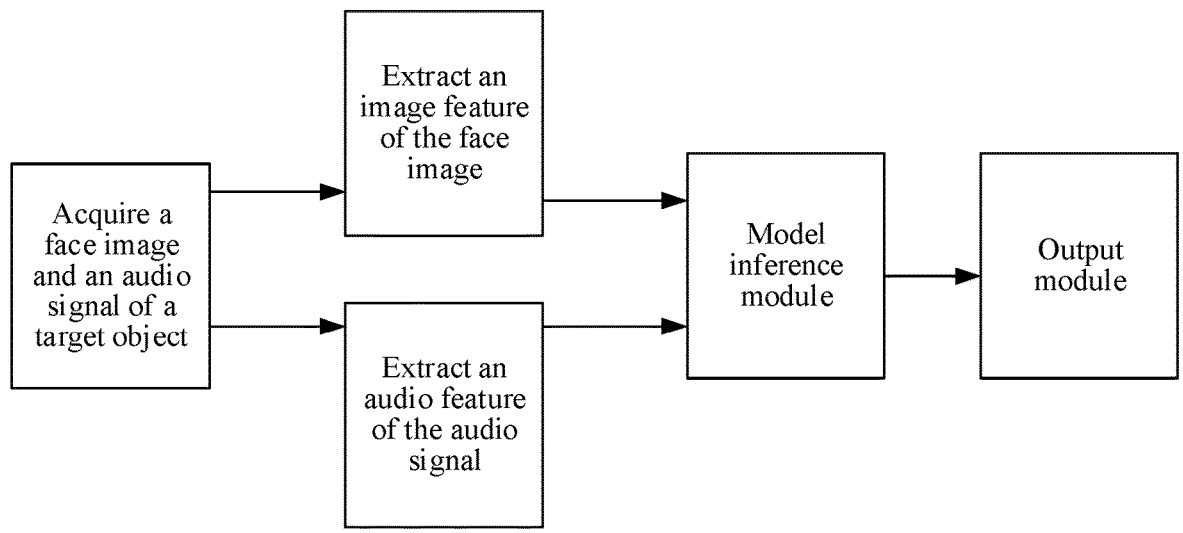
FIG. 7 is a schematic diagram of determining a category based on a model according to an embodiment of the present disclosure.

Referring to FIG. 7, the terminal further includes a model application module and an output module. The terminal acquires a face image and an audio signal of a target object, and determines a category to which the face image belongs and the category to which the audio signal belongs respectively based on the trained first classification model and second classification model. That is, the terminal acquires a face image and an audio signal, extracts an image feature of the face image and an audio feature of the audio signal respectively, inputs the image feature and the audio feature into the model application module, classifies the image feature based on the first classification model through the model application module, outputs a category to which the face image corresponding to the image feature belongs through the output module, classifies the audio feature based on the second classification model through the model application module, and outputs a category to which the audio signal corresponding to the audio feature belongs through the output module.

Figure 8:
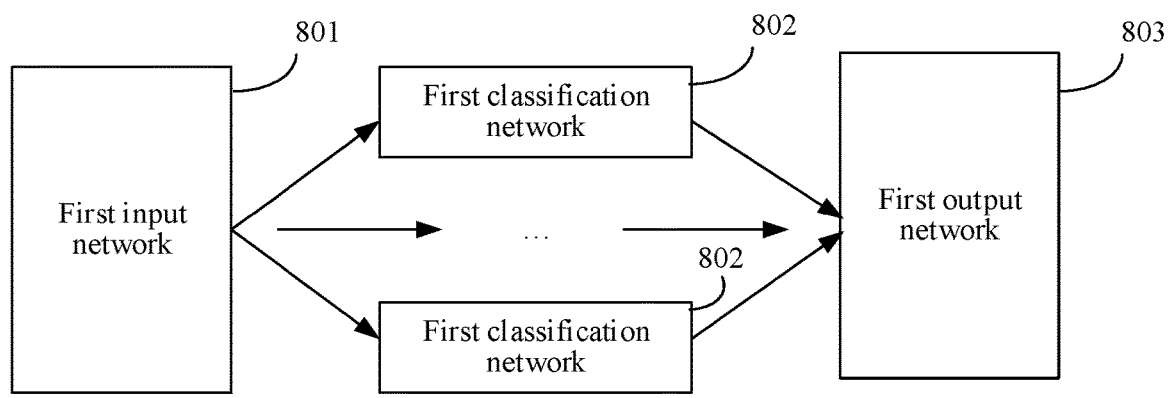
FIG. 8 is a schematic structural diagram of a first classification model according to an embodiment of the present disclosure.

In one embodiment, the structure of the first classification model is shown in FIG. 8. The first classification model includes a first input network 801, a plurality of first classification networks 802, and a first output network 803. The first input network 801 is configured to divide an inputted image feature into a plurality of second region features, each second classification network 802 is configured to classify a second face region corresponding to a second region feature, and the first output network 803 is configured to output a category to which a face image belongs.

Figure 9:
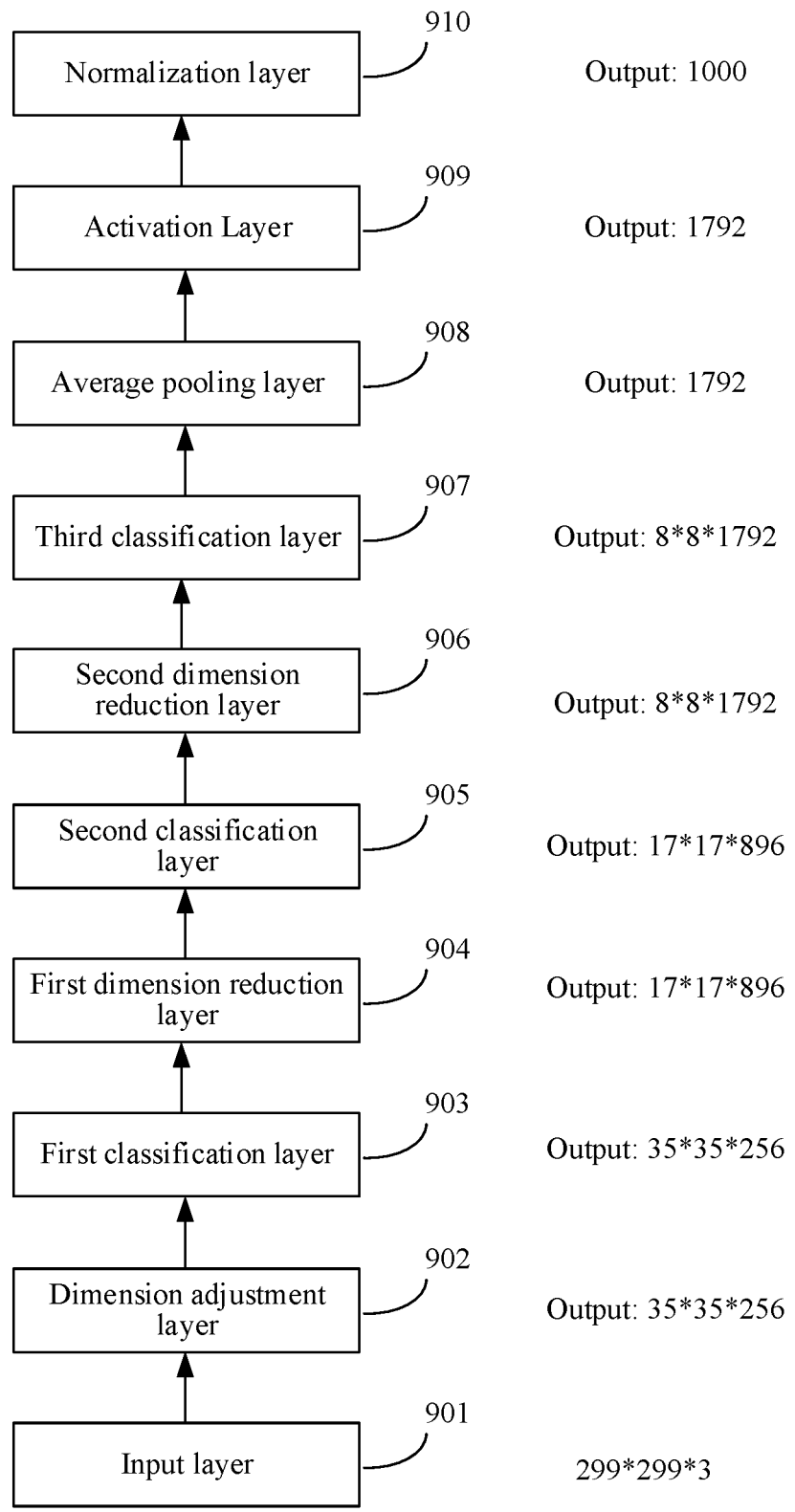
FIG. 9 is a schematic structural diagram of a first classification network according to an embodiment of the present disclosure.

Referring to FIG. 9, each classification network 802 includes an input layer 901, a dimension adjustment layer 902, a first classification layer 903, a first dimension reduction layer 904, a second classification layer 905, a second dimension reduction layer 906, a third classification layer 907, an average pooling layer 908, an activation layer (Dropout) 909, and a normalization layer (Softmax) 910. For example, the dimension of the feature inputted by the first classification model is 299*299*3, and the dimension of the feature outputted by the dimension adjustment layer 902 is 35*35*256. After the feature is preliminarily classified by the first classification layer 902, the dimension of the outputted feature is still 35*35*256, and the dimension of the feature outputted by the first dimension reduction layer 903 is 17*17*896. Then the feature is processed by the second classification layer 905, the second dimension reduction layer 906, and the third classification layer 907, and the dimension of the outputted feature is 8*8*1792. Then the feature is processed by the average pooling layer 908, to output a numerical value. Then the numerical value is processed by the activation layer 909 and the normalization layer 910, to output the classification result. In some embodiments, for the first classification layer 903, the second classification layer 905, and the third classification layer 907, the classification network 802 includes a plurality of first classification layers 903, a plurality of second classification layers 905, and a plurality of third classification layers 907. Certainly, in another embodiment, the network structure of the classification network 802 may be in other forms, which is not limited in the present disclosure.

Figure 10:
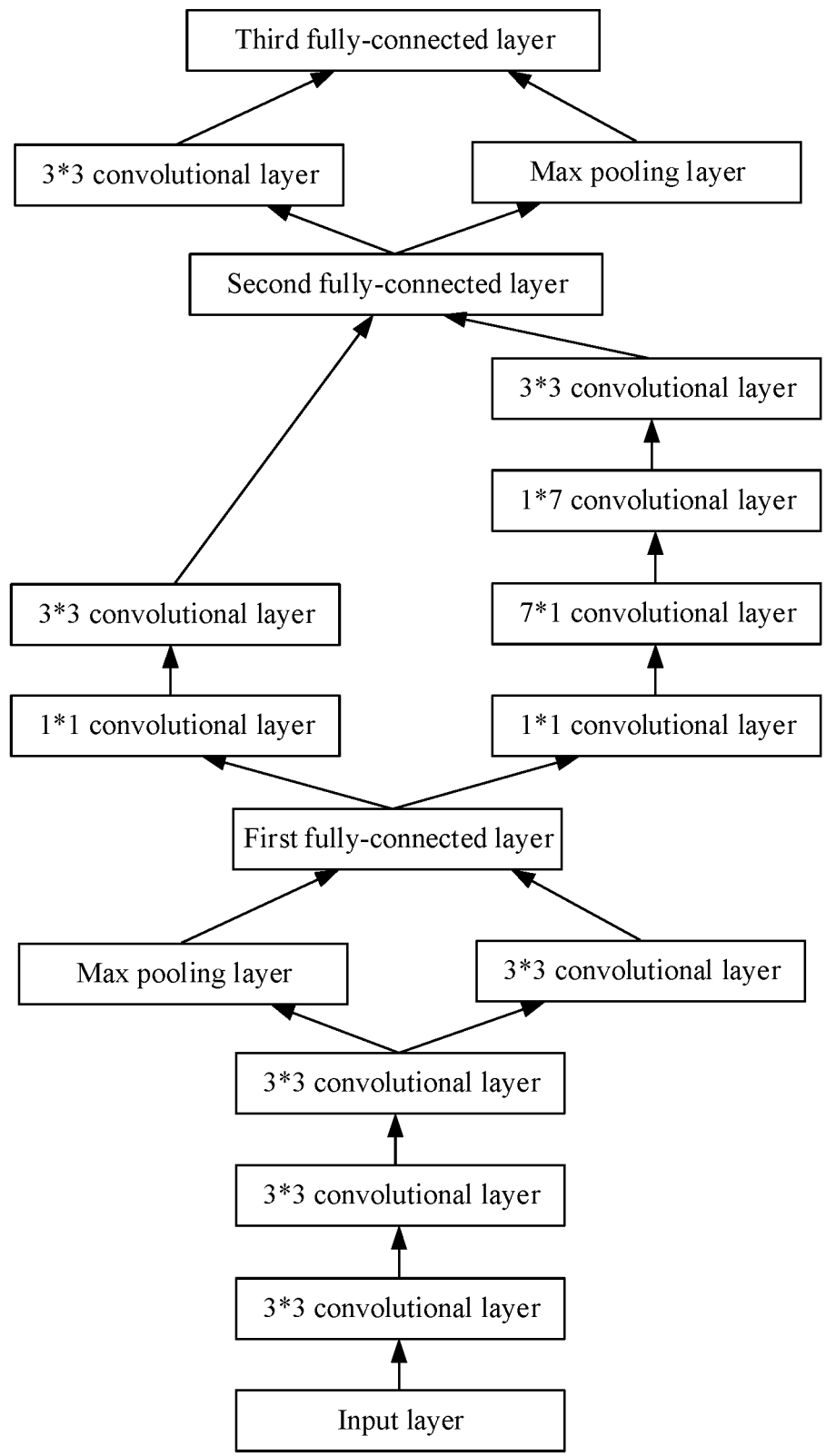
FIG. 10 is a schematic structural diagram of a classification layer according to an embodiment of the present disclosure.

In some embodiments, for any classification layer, the structure of the classification layer is shown in FIG. 10. A second region feature is inputted into the input layer, and the second region feature is processed through three convolutional layers with a convolution kernel of 3*3. The processed second region feature is processed again through the convolutional layer with convolution kernel of 3*3 and a max pooling layer respectively, and the processed feature of the convolutional layer and the processed feature of the max pooling layer are concatenated through a first fully-connected layer. A concatenated first feature is processed again through a convolutional layer with convolution kernel of 1*1 and a convolutional layer with convolution kernel of 3*3 to obtain a second feature, and the concatenated first feature is processed again through a convolutional layer with convolution kernel of 1*1, a convolutional layer with convolution kernel of 7*1, a convolutional layer with convolution kernel of 1*7, and a convolutional layer with convolution kernel of 3*3 to obtain a third feature. The second feature and the third feature are concatenated through a second fully-connected layer. A concatenated fourth feature is processed through a convolutional layer with convolution kernel of 3*3 to obtain a fifth feature. The second feature is processed through the max pooling layer to obtain a sixth feature. The fifth feature and the sixth feature are concatenated through a third fully-connected layer to obtain a category to which the second face region corresponding to the second region feature belongs. Certainly, in another embodiment, the network structure of any classification layer may be in other forms, which is not limited in the present disclosure.

Figure 11:
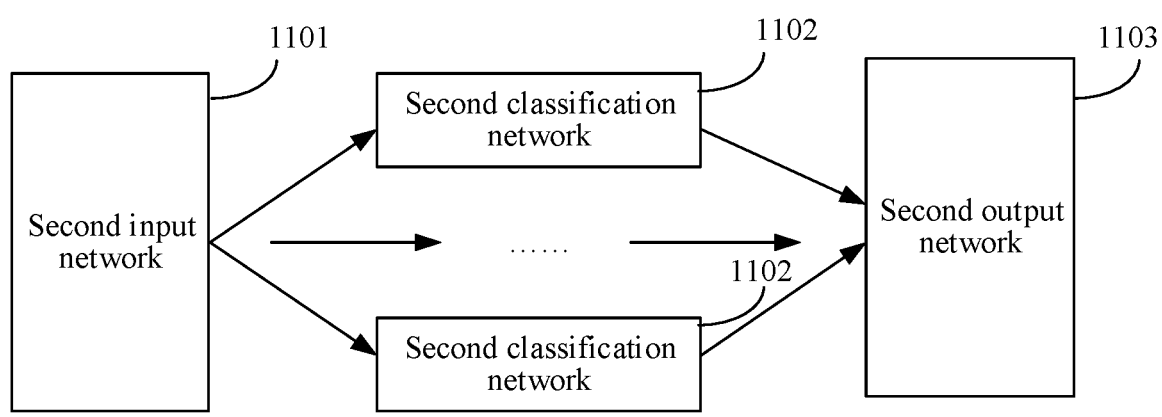
FIG. 11 is a schematic structural diagram of a second classification model according to an embodiment of the present disclosure.

In one embodiment, the structure of the second classification model is shown in FIG. 11. The second classification model includes a second input network 1101, a plurality of second classification networks 1102, and a second output network 1103. The second input network 1101 is configured to divide an inputted audio feature into a plurality of second clip features, each second classification network 1102 is configured to classify a second audio clip corresponding to a second clip feature, and the second output network 1103 is configured to output a category to which the audio signal belongs.

Figure 12:
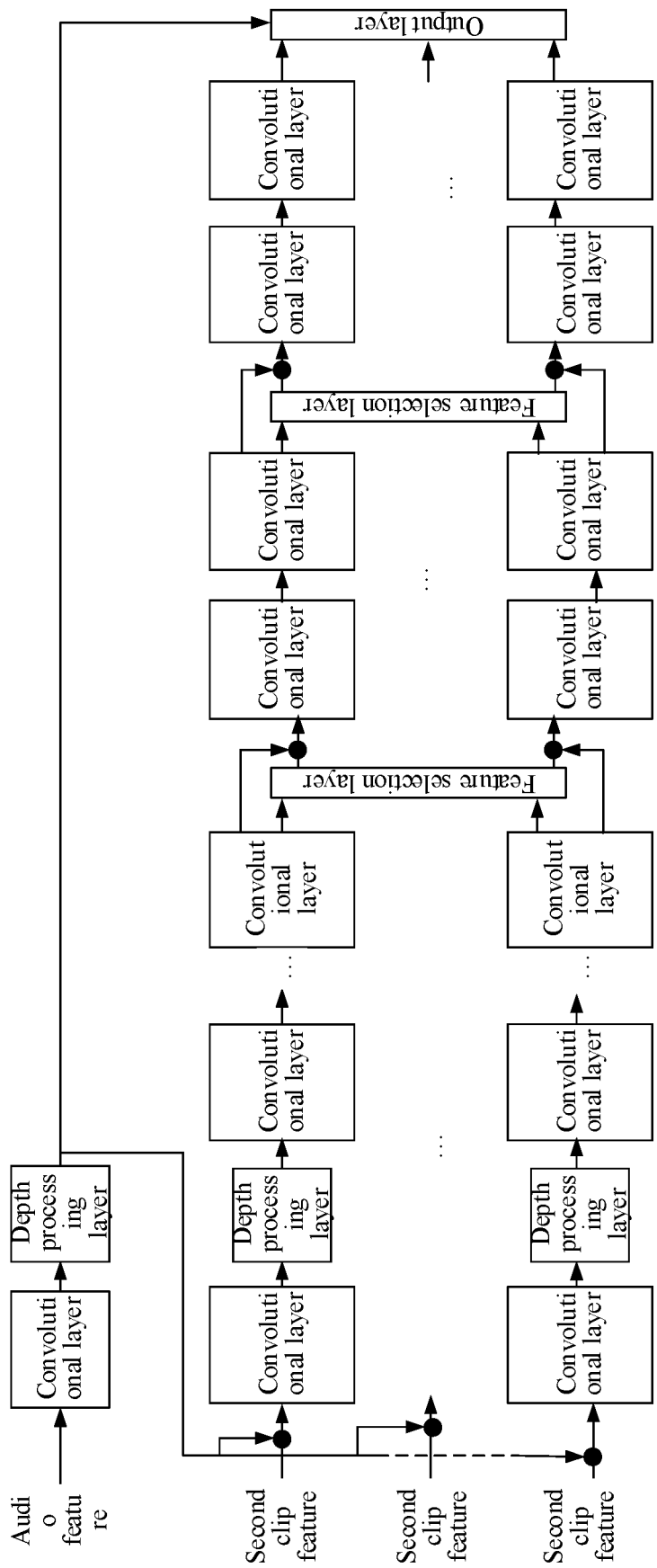
FIG. 12 is a schematic structural diagram of another second classification model according to an embodiment of the present disclosure.

In some embodiments, the detailed classification process of the second classification model is shown in FIG. 12. An audio feature and a plurality of second clip features are inputted, and the audio feature is processed through a convolutional layer and a depth processing layer. For each second clip feature, the processed audio feature and the second clip feature are processed through a plurality of convolutional layers and a plurality of depth processing layers to obtain a processed second clip feature. Then, a maximum second clip feature is selected from the plurality of processed second clip features through a feature selection layer, and the selected feature and the feature outputted from the previous convolutional layer are inputted into the next convolutional layer after the feature selection layer. Similarly, the category to which the second audio clip corresponding to each second clip feature is obtained through the feature selection layer and the plurality of convolutional layers again. The processing result of the audio feature and the categories to which the plurality of second audio clips belong are inputted into an output layer, and the category to which the audio signal belongs is outputted after the processing of the output layer.

In one embodiment, in order to further improve the classification accuracy of the first classification model and the second classification model, the first classification model and the second classification model need to include a residual network structure and a Batch Normalization structure. The residual network structure can prevent the network degradation during feature processing and improve the processing speed of the model; and the Batch Normalization structure can accelerate the convergence speed of the model and prevent the disappearance of gradient.

In one embodiment, the outputs of the first classification model and the second classification model are 0 or 1. If the output is 0, it indicates that the classification model belongs to a lifeless category, and if the output is 1, it indicates that the classification model belongs to a living category.

Figure 13:
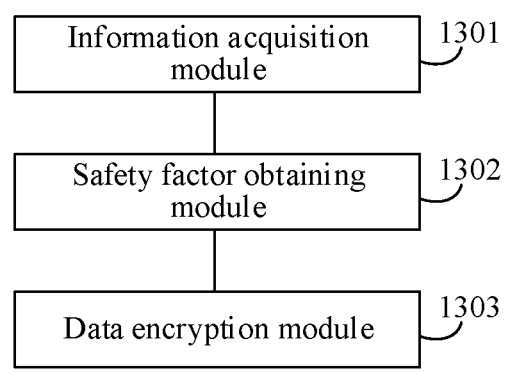
FIG. 13 is a schematic structural diagram of a data encryption apparatus according to an embodiment of the present disclosure.

FIG. 13 is a schematic structural diagram of a data encryption apparatus according to an embodiment of the present disclosure. Referring to FIG. 13, the apparatus includes:
- an information acquisition module 1301, configured to acquire target data to be encrypted of a target object and object information corresponding to the target object, the object information including at least one of a face image or an audio signal of the target object;
- a safety factor obtaining module 1302, configured to encrypt an object feature corresponding to the object information according to a reference public key, and determine the encrypted object feature as a safety factor of the target data; and
- a data encryption module 1303, configured to encrypt the target data based on the safety factor, to obtain encrypted data corresponding to the target data.

According to the apparatus provided in this embodiment of the present disclosure, during acquiring of the target data to be encrypted, at least one of the face image or the audio signal of the target object is acquired, and at least one of the feature of the face image or the feature of the audio signal is encrypted, so that the encrypted feature is used as the safety factor for encrypting the target data. In this encryption manner, the safety factor used for encrypting the target data includes at least one of the feature of the face image or the feature of the audio signal, and the feature of the face image or the feature of the audio signal is more complex and difficult to crack, thereby improving the security of the encrypted data.

Figure 14:
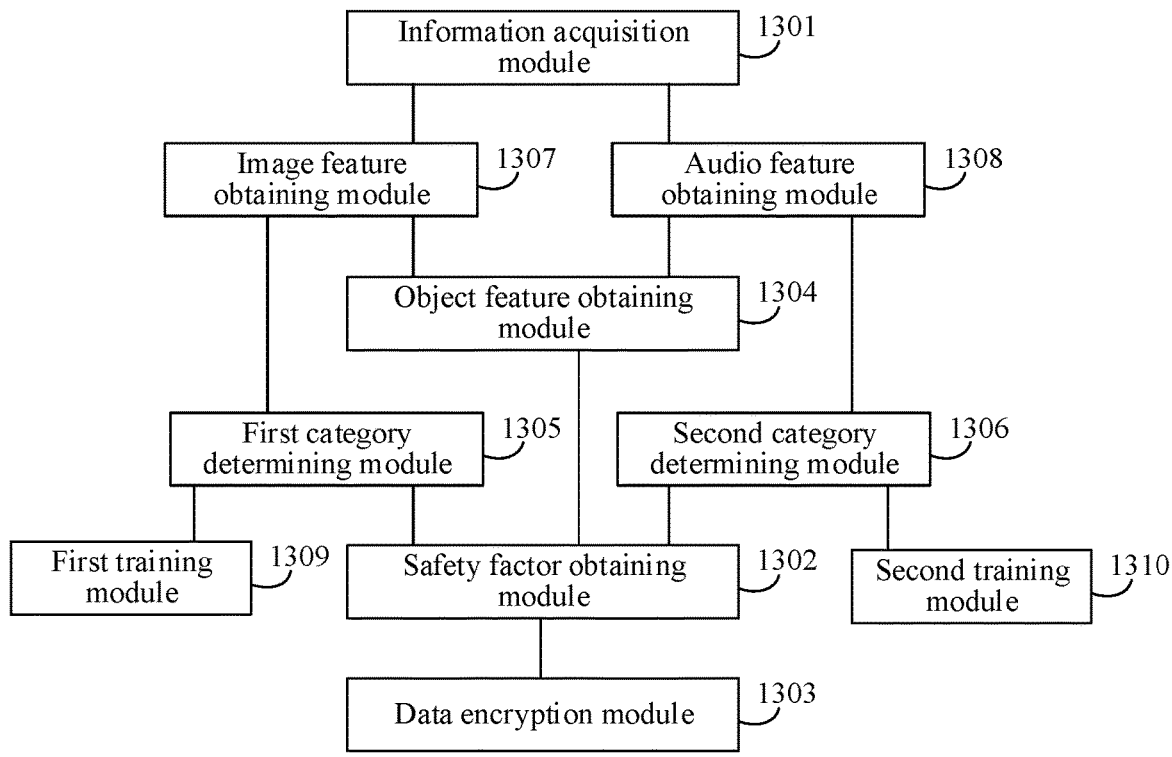
FIG. 14 is a schematic structural diagram of another data encryption apparatus according to an embodiment of the present disclosure.

In some embodiments, the object information includes the face image and the audio signal. Referring to FIG. 14, the apparatus further includes:
- an object feature obtaining module 1304, configured to obtain an image feature of the face image and an audio feature of the audio signal respectively.

The object feature obtaining module 1304 is further configured to concatenate the image feature and the audio feature, and determine the concatenated feature as the object feature.

In some embodiments, the data encryption module 1303 is configured to encrypt the target data based on an encryption format corresponding to the target data and the safety factor, to obtain the encrypted data, where the encryption format indicates a relative position relationship between the safety factor and the target data in the encrypted data.

In some embodiments, the safety factor obtaining module 1302 is configured to: encrypt the object feature according to the reference public key when the object information belongs to a living category, and determine the encrypted object feature as the safety factor, where the living category represents that the object information is information about a living object.

In some embodiments, the object information includes the face image. Referring to FIG. 14, the apparatus further includes:
- a first category determining module 1305, configured to obtain an image feature of the face image, and divide the image feature into a plurality of first region features, where the face image includes a plurality of first face regions, and each first region feature corresponds to a first face region in the face image.

The first category determining module 1305 is further configured to determine a category to which the first face region corresponding to the each first region feature belongs based on the each first region feature.

The first category determining module 1305 is further configured to determine a first ratio of first face regions belonging to the living category in the plurality of first face regions.

The first category determining module 1305 is further configured to determine that the face image belongs to the living category in response to the first ratio being greater than a first reference ratio.

In some embodiments, the object information includes the audio signal. Referring to FIG. 14, the apparatus further includes:
- a second category determining module 1306, configured to obtain an audio feature of the audio signal, and divide the audio feature into a plurality of first clip features, where the audio signal includes a plurality of first audio clips, and each first clip feature corresponds to a first audio clip in the audio signal.

The second category determining module 1306 is further configured to determine a category to which the first audio clip corresponding to the each first clip feature belongs based on the each first clip feature.

The second category determining module 1306 is further configured to determine a second ratio of first audio clips belonging to the living category in the plurality of first audio clips.

The second category determining module 1306 is further configured to determine that the audio signal belongs to the living category in response to the second ratio being greater than a second reference ratio.

In some embodiments, referring to FIG. 14, the second category determining module 1306 is further configured to determine, for the each first clip feature, the category to which the first audio clip corresponding to the each first clip feature belongs based on the first clip feature and the audio feature.

In some embodiments, the object information includes the face image, and the object feature includes an image feature of the face image. Referring to FIG. 14, the apparatus further includes:
- an image feature obtaining module 1307, configured to divide the face image into a plurality of second face regions.

The image feature obtaining module 1307 is further configured to perform feature extraction on the plurality of second face regions respectively, to obtain a second region feature of each second face region.

The image feature obtaining module 1307 is further configured to concatenate the plurality of obtained second region features, to obtain the image feature.

In some embodiments, referring to FIG. 14, the image feature obtaining module 1307 is further configured to perform, for the each second face region, edge detection on the second face region to obtain an image gradient corresponding to the second face region, and determine the image gradient as the second region feature of the second face region, where the image gradient represents a change rate of any two adjacent pixel points in the second face region.

In some embodiments, the object information includes the audio signal, and the object feature includes an audio feature of the audio signal. Referring to FIG. 14, the apparatus further includes:
- an audio feature obtaining module 1308, configured to divide the audio signal into a plurality of second audio clips.

The audio feature obtaining module 1308 is further configured to perform feature extraction on the plurality of second audio clips respectively, to obtain a second clip feature of each second audio clip.

The audio feature obtaining module 1308 is further configured to concatenate the plurality of obtained second clip features, to obtain the audio feature.

In some embodiments, referring to FIG. 14, the audio feature obtaining module 1308 is further configured to:
perform, for the each second audio clip, Fourier transform on the second audio clip to obtain a transformed second audio clip; and
convert the transformed second audio clip into a spectral feature corresponding to the second audio clip, and determine the spectral feature as the second clip feature of the second audio clip.

In some embodiments, the safety factor obtaining module 1302 is further configured to encrypt the object feature and a reference feature respectively according to the reference public key, and determine the encrypted object feature and the encrypted reference feature as the safety factor of the target data, where the reference feature includes at least a timestamp or a counter.

In some embodiments, the object information includes the face image. Referring to FIG. 14, the apparatus further includes:
a first category determining module 1305, configured to classify an image feature of the face image based on a first classification model, to obtain a category to which the face image belongs.

In some embodiments, referring to FIG. 14, the apparatus further includes:
a first training module 1309, configured to obtain a sample image feature and a sample category to which a sample face image corresponding to the sample image feature belongs, where the sample category includes a living category and a lifeless category, the living category represents that the sample face image is an image of a living object, and the lifeless category represents that the sample face image is an image of a non-living object.

The first training module 1309 is further configured to determine a prediction category to which the sample face image belongs according to the sample image feature based on the first classification model.

The first training module 1309 is further configured to train the first classification model according to the sample category and the prediction category.

In some embodiments, the object information includes the audio signal. Referring to FIG. 14, the apparatus further includes:
a second category determining module 1306, configured to classify an audio feature of the audio signal based on a second classification model, to obtain a category to which the audio signal belongs.

In some embodiments, referring to FIG. 14, the apparatus further includes:
a second training module 1310, configured to obtain a sample audio feature and a sample category to which a sample audio signal corresponding to the sample audio feature belongs, where the sample category includes a living category and a lifeless category, the living category represents that the sample audio signal is an audio signal of a living object, and the lifeless category represents that the sample audio signal is an audio signal of a non-living object.

The second training module 1310 is further configured to determine a prediction category to which the sample audio signal belongs according to the sample audio feature based on the second classification model.

The second training module 1310 is further configured to train the second classification model according to the sample category and the prediction category.

All the foregoing example technical solutions may be combined in different manners to form other embodiments of the present disclosure, and details are not described herein again.

When the data encryption apparatus provided by the above embodiment encrypts data, only division of the functional modules is illustrated. In actual application, the functions may be assigned to different functional modules for completion as required. In other words, an internal structure of the computer device is divided into different functional modules to complete all or a part of the functions described above. In addition, the data encryption apparatus provided in the foregoing embodiment is based on the same concept as the embodiments of the data encryption method. For a specific implementation process, refer to the method embodiments, and details are not described herein again.

An embodiment of the present disclosure further provides a computer device, including a processor and a memory, the memory storing at least one computer program, the at least one computer program being loaded and executed by the processor to implement the operations in the data encryption method in the foregoing embodiments.

Figure 15:
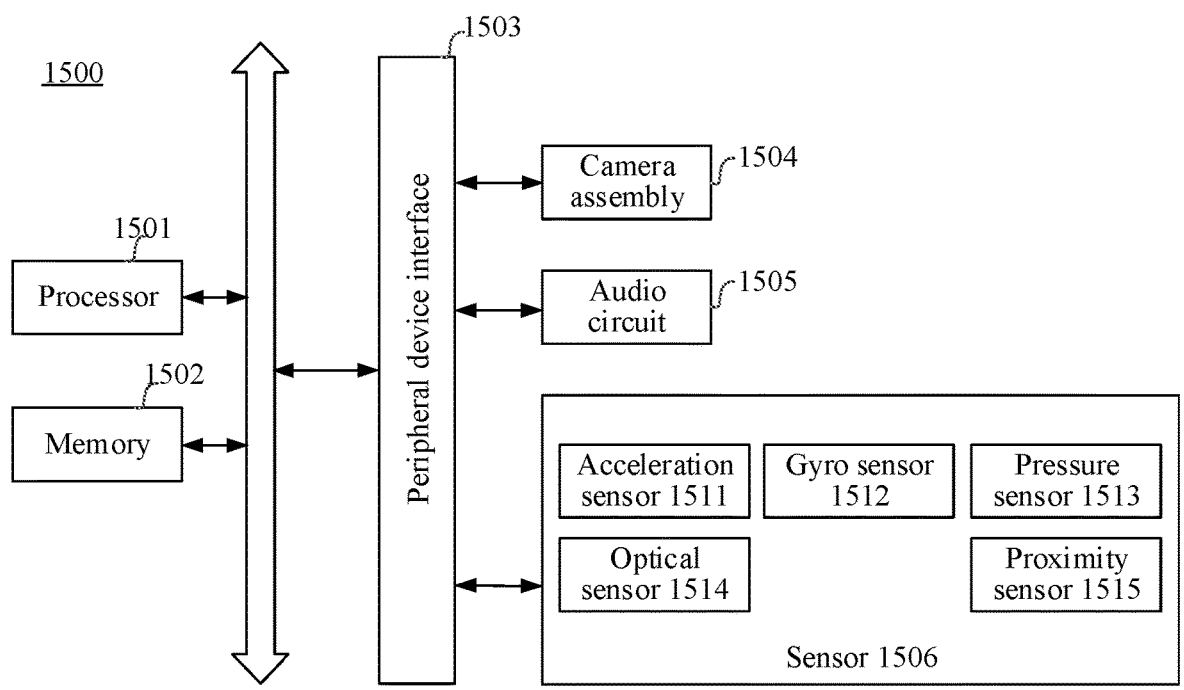
FIG. 15 is a schematic structural diagram of a terminal according to an embodiment of the present disclosure.

In some embodiments, the computer device is provided as a terminal. FIG. 15 is a schematic structural diagram of a terminal 1500 according to an embodiment of the present disclosure. The terminal 1500 may be a smartphone, a tablet computer, a notebook computer, a desktop computer, a smart speaker, a smart watch, a face scanning device, or the like. The terminal 1500 may also be referred to as another name such as user equipment, a portable terminal, a laptop terminal, or a desktop terminal.

The terminal 1500 includes: a processor 1501 and a memory 1502.

The processor 1501 may include one or more processing cores, such as a 4-core processor or an 8-core processor. The processor 1501 may be implemented by using at least one hardware form of a digital signal processor (DSP), a field-programmable gate array (FPGA), and a programmable logic array (PLA). In some embodiments, the processor 1501 may further include an artificial intelligence (AI) processor. The AI processor is configured to process a computing operation related to machine learning.

The memory 1502 may include one or more computer-readable storage media that may be non-transitory. In some embodiments, the non-transient computer-readable storage medium in the memory 1502 is configured to store at least one computer program, and the at least one computer program is configured to be executed by the processor 1501 to implement the data encryption method provided in the method embodiments of the present disclosure.

In some embodiments, the terminal 1500 may include: a peripheral device interface 1503 and at least one peripheral device. The processor 1501, the memory 1502, and the peripheral device interface 1503 may be connected by using a bus or a signal cable. Each peripheral device may be connected to the peripheral device interface 1503 by using a bus, a signal cable, or a circuit board. Specifically, the peripheral device includes: at least one of a camera assembly 1504 and an audio circuit 1505.

The peripheral interface 1503 may be configured to connect at least one input/output (I/O)-related peripheral to the processor 1501 and the memory 1502. In some embodiments, the processor 1501, the memory 1502, and the peripheral interface 1503 are integrated on the same chip or the same circuit board. In some other embodiments, any one or two of the processor 1501, the memory 1502, and the peripheral device interface 1503 may be implemented on a separate chip or circuit board, which is not limited in this embodiment.

The camera assembly 1504 is configured to capture an image or a video. In some embodiments, the camera component 1504 includes a front-facing camera and a rear-facing camera. The front-facing camera is disposed on the front panel of the terminal, and the rear-facing camera is disposed on a back surface of the terminal. In some embodiments, there are at least two rear-facing cameras, each being any one of a main camera, a depth-of-field camera, a wide-angle camera, and a telephoto camera, to achieve a background blurring function through fusion of the main camera and the depth-of-field camera, panoramic photo shooting and virtual reality (VR) shooting functions through fusion of the main camera and the wide-angle camera, or another fusion shooting function.

The audio circuit 1505 may include a microphone and a speaker. The microphone is configured to acquire sound waves from a user and an environment and convert the sound waves into electrical signals that are inputted to the processor 1501 for processing or to the radio frequency circuit 1504 for voice communication. For purposes of stereo acquisition or noise reduction, there may be a plurality of microphones, which are respectively arranged at different parts of the terminal 1500. The speaker is configured to convert the electrical signals from the processor 1501 or the radio frequency circuit 1504 into sound waves. The speaker may be a thin-film speaker or a piezoelectric ceramic speaker.

In some embodiments, the terminal 1500 further includes one or more sensors 1506. The one or more sensors 1506 include but are not limited to an acceleration sensor 1511, a gyro sensor 1512, a pressure sensor 1513, an optical sensor 1514, and a proximity sensor 1515.

A person skilled in the art may understand that the structure shown in FIG. 15 constitutes no limitation on the terminal 1500, and the terminal may include more or fewer components than those shown in the figure, or some components may be combined, or a different component deployment may be used.

Figure 16:
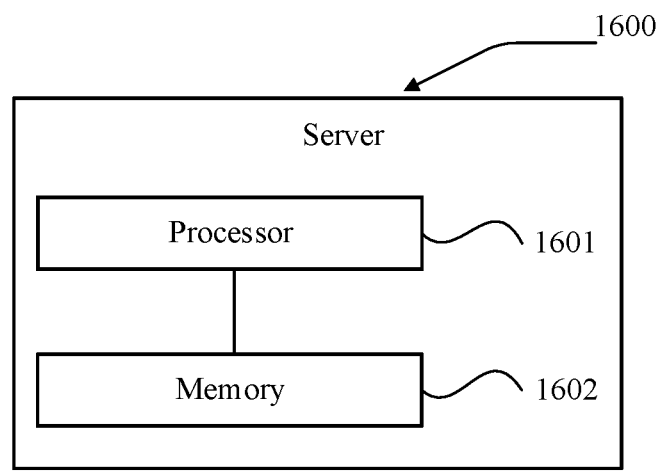
FIG. 16 is a schematic structural diagram of a server according to an embodiment of the present disclosure.

In some embodiments, the computer device is provided as a server. FIG. 16 is a schematic structural diagram of a server according to an embodiment of the present disclosure. The server 1600 may vary greatly due to different configurations or performance, and may include one or more central processing units (CPUs) 1601 and one or more memories 1602. The memory 1602 stores at least one computer program, the at least one computer program being loaded and executed by the processor 1601 to implement the methods provided in the foregoing method embodiments. Certainly, the server may further include components such as a wired or wireless network interface, a keyboard, and an input/output interface, to facilitate inputs/outputs. The server may further include another component configured to implement functions of a device. Details are not described herein again.

An embodiment of the present disclosure further provides a computer-readable storage medium. The computer-readable storage medium stores at least one computer program, the at least one computer program being loaded and executed by a processor to implement the operations in the data encryption method in the foregoing embodiments.

An embodiment of the present disclosure further provides a computer program product or a computer program. The computer program product or the computer program stores computer program code, the computer program code being stored in a computer-readable storage medium. A processor of a computer device reads the computer program code from the computer-readable storage medium, and the processor executes the computer program code, to cause the computer device to implement the operations performed in the data encryption method according to the foregoing embodiment.

In the embodiments of the present disclosure, relevant data such as face images and audio signals are involved. When the above embodiments of the present disclosure are applied to specific products or technologies, permission or consent of the user is required, and the acquisition, use and processing of the relevant data need to comply with the relevant laws, regulations and standards of relevant countries and regions.

A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely example embodiments of the embodiments of the present disclosure, but are not intended to limit the embodiments of the present disclosure. Any modification, equivalent replacement, or improvement made without departing from the spirit and principle of the embodiments of the present disclosure is to fall within the protection scope of the present disclosure.

What is claimed is:

1. A data encryption method, performed by a computer device, the method comprising:
   acquiring target data to be encrypted of a target object and object information corresponding to the target object, the object information comprising a face image and an audio signal of the target object;
   obtaining an image feature of the face image and an audio feature of the audio signal of the target object respectively;
   concatenating the image feature and the audio feature, and determining the concatenated feature as an object feature;
   encrypting the object feature corresponding to the object information according to a reference public key, and determining the encrypted object feature as a safety factor of the target data; and
   encrypting the target data based on the safety factor, to obtain encrypted data corresponding to the target data.

2. The method according to claim 1, wherein the encrypting the target data based on the safety factor, to obtain encrypted data corresponding to the target data comprises:
   encrypting the target data based on an encryption format corresponding to the target data and the safety factor, to obtain the encrypted data, wherein the encryption format indicates a relative position relationship between the safety factor and the target data in the encrypted data.

3. The method according to claim 1, wherein the encrypting an object feature corresponding to the object information according to a reference public key, and determining the encrypted object feature as a safety factor of the target data comprises:

encrypting the object feature according to the reference public key when the object information belongs to a living category, and determining the encrypted object feature as the safety factor, wherein the living category represents that the object information is information about a living object.

4. The method according to claim 3, wherein the object information comprises the face image, the method further comprises:

obtaining an image feature of the face image, and dividing the image feature into a plurality of first region features, wherein the face image comprises a plurality of first face regions, and each first region feature corresponds to a first face region in the face image;

determining a category to which the first face region corresponding to the each first region feature belongs based on the each first region feature;

determining a first ratio of first face regions belonging to the living category in the plurality of first face regions; and determining that the face image belongs to the living category in response to the first ratio being greater than a first reference ratio.

5. The method according to claim 3, wherein the object information comprises the audio signal, the method further comprises:

obtaining an audio feature of the audio signal, and dividing the audio feature into a plurality of first clip features, wherein the audio signal comprises a plurality of first audio clips, and each first clip feature corresponds to a first audio clip in the audio signal;

determining a category to which the first audio clip corresponding to the each first clip feature belongs based on the each first clip feature;

determining a second ratio of first audio clips belonging to the living category in the plurality of first audio clips; and determining that the audio signal belongs to the living category in response to the second ratio being greater than a second reference ratio.

6. The method according to claim 5, wherein the determining a category to which the first audio clip corresponding to the each first clip feature belongs based on the each first clip feature comprises:

determining, for the each first clip feature, the category to which the first audio clip corresponding to the each first clip feature belongs based on the first clip feature and the audio feature.

7. The method according to claim 3, wherein the object information comprises the face image, the method further comprises:

classifying an image feature of the face image based on a first classification model, to obtain a category to which the face image belongs.

8. The method according to claim 3, wherein the object information comprises the audio signal, the method further comprises:

classifying an audio feature of the audio signal based on a second classification model, to obtain a category to which the audio signal belongs.

9. The method according to claim 1, wherein the object information comprises the face image, the object feature comprises an image feature of the face image, the method further comprises:

dividing the face image into a plurality of second face regions;

performing feature extraction on the plurality of second face regions respectively, to obtain a second region feature of each second face region; and concatenating the plurality of obtained second region features, to obtain the image feature.

10. The method according to claim 9, wherein the performing feature extraction on the plurality of second face regions respectively, to obtain a second region feature of each second face region comprises:

performing, for the each second face region, edge detection on the second face region to obtain an image gradient corresponding to the second face region, and determining the image gradient as the second region feature of the second face region, wherein the image gradient represents a change rate of any two adjacent pixel points in the second face region.

11. The method according to claim 1, wherein the object information comprises the audio signal, the object feature comprises an audio feature of the audio signal, the method further comprises:

dividing the audio signal into a plurality of second audio clips;

performing feature extraction on the plurality of second audio clips respectively, to obtain a second clip feature of each second audio clip; and concatenating the plurality of obtained second clip features, to obtain the audio feature.

12. A data encryption apparatus, comprising:

a processor and a memory, the memory storing at least one computer program, the at least one computer program being loaded and executed by the processor to implement:

acquiring target data to be encrypted of a target object and object information corresponding to the target object, the object information comprising a face image and an audio signal of the target object;

obtaining an image feature of the face image and an audio feature of the audio signal of the target object respectively;

concatenating the image feature and the audio feature, and determining the concatenated feature as an object feature;

encrypting the object feature corresponding to the object information according to a reference public key, and determining the encrypted object feature as a safety factor of the target data; and encrypting the target data based on the safety factor, to obtain encrypted data corresponding to the target data.

13. The apparatus according to claim 12, wherein the encrypting the target data based on the safety factor, to obtain encrypted data corresponding to the target data comprises:

encrypting the target data based on an encryption format corresponding to the target data and the safety factor, to obtain the encrypted data, wherein the encryption format indicates a relative position relationship between the safety factor and the target data in the encrypted data.

14. The apparatus according to claim 12, wherein the encrypting an object feature corresponding to the object information according to a reference public key, and determining the encrypted object feature as a safety factor of the target data comprises:

encrypting the object feature according to the reference public key when the object information belongs to a living category, and determining the encrypted object feature as the safety factor, wherein the living category represents that the object information is information about a living object.

15. The apparatus according to claim 14, wherein the object information comprises the face image, and the processor is further configured to perform:

obtaining an image feature of the face image, and dividing the image feature into a plurality of first region features, wherein the face image comprises a plurality of first face regions, and each first region feature corresponds to a first face region in the face image;

determining a category to which the first face region corresponding to the each first region feature belongs based on the each first region feature;

determining a first ratio of first face regions belonging to the living category in the plurality of first face regions; and determining that the face image belongs to the living category in response to the first ratio being greater than a first reference ratio.

16. The apparatus according to claim 14, wherein the object information comprises the audio signal, and the processor is further configured to perform:

obtaining an audio feature of the audio signal, and dividing the audio feature into a plurality of first clip features, wherein the audio signal comprises a plurality of first audio clips, and each first clip feature corresponds to a first audio clip in the audio signal;

determining a category to which the first audio clip corresponding to the each first clip feature belongs based on the each first clip feature;

determining a second ratio of first audio clips belonging to the living category in the plurality of first audio clips; and determining that the audio signal belongs to the living category in response to the second ratio being greater than a second reference ratio.

17. The apparatus according to claim 16, wherein the determining a category to which the first audio clip corresponding to the each first clip feature belongs based on the each first clip feature comprises:

determining, for the each first clip feature, the category to which the first audio clip corresponding to the each first clip feature belongs based on the first clip feature and the audio feature.

18. A non-transitory computer-readable storage medium, storing at least one computer program, the at least one computer program being loaded and executed by a processor to implement:

acquiring target data to be encrypted of a target object and object information corresponding to the target object, the object information comprising a face image and an audio signal of the target object;

obtaining an image feature of the face image and an audio feature of the audio signal of the target object respectively;

concatenating the image feature and the audio feature, and determining the concatenated feature as an object feature;

encrypting the object feature corresponding to the object information according to a reference public key, and determining the encrypted object feature as a safety factor of the target data; and encrypting the target data based on the safety factor, to obtain encrypted data corresponding to the target data.

* * * * *